(No Model.) 2 Sheets—Sheet 1.

A. MEKENNEY.
FERTILIZER DISTRIBUTER.

No. 328,596. Patented Oct. 20, 1885.

WITNESSES
Bowdoin S. Parker
Fred. P. Dolan

INVENTOR
A. Mekenney
by his attys
Clarke & Raymond (No Model.)  2 Sheets—Sheet 2.
A. MEKENNEY.
FERTILIZER DISTRIBUTER.
No. 328,596.  Patented Oct. 20, 1885.
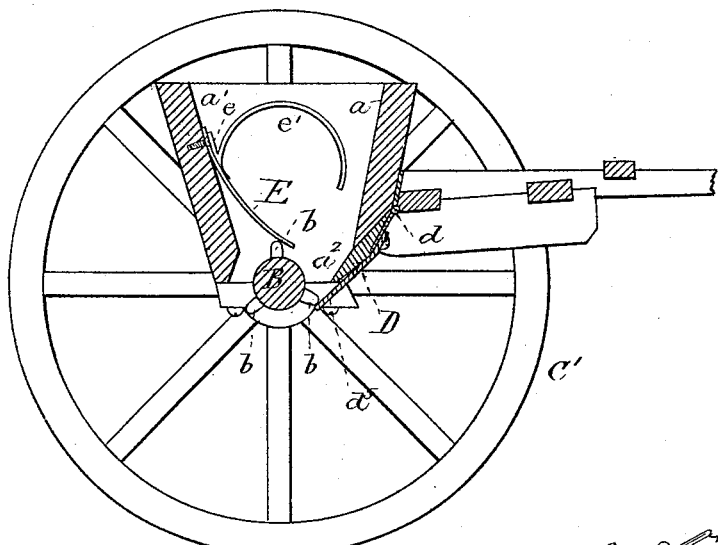
Fig. 3.
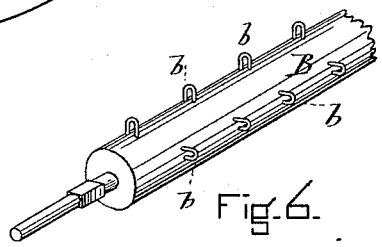
Fig. 6.
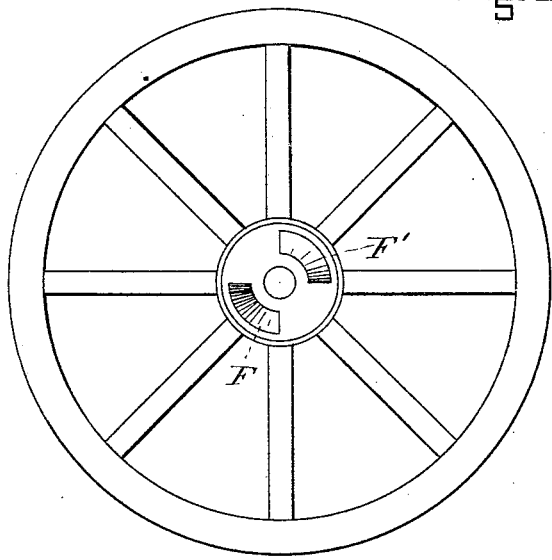
Fig. 4.
Fig. 5.
WITNESSES
Bowdoin S. Parker
Fred P. Dolan
INVENTOR
Alando Mekenney
by his attys
Clarke & Raymond

UNITED STATES PATENT OFFICE.

ALENDO MEKENNEY, OF MIDDLEBOROUGH, MASSACHUSETTS.

FERTILIZER-DISTRIBUTER.

SPECIFICATION forming part of Letters Patent No. 328,596, dated October 20, 1885.

Application filed March 12, 1884. Serial No. 123,852. (No model.)

*To all whom it may concern:*

Be it known that I, ALENDO MEKENNEY, of Middleborough, in the county of Plymouth and State of Massachusetts, a citizen of the United States, have invented a new and useful Improvement in Fertilizer - Distributers, of which the following is a full, clear, and exact description, reference being had to the accompanying drawings, forming a part of this specification in explaining its nature, in which—

Figure 1:
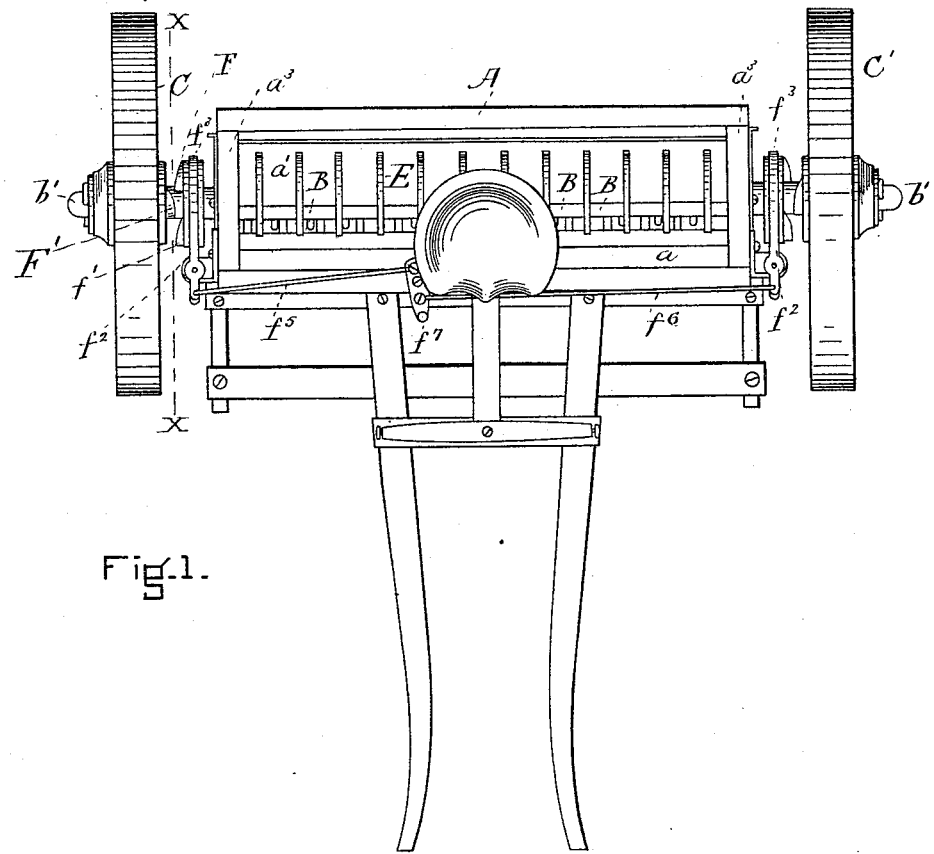
Figure 2:
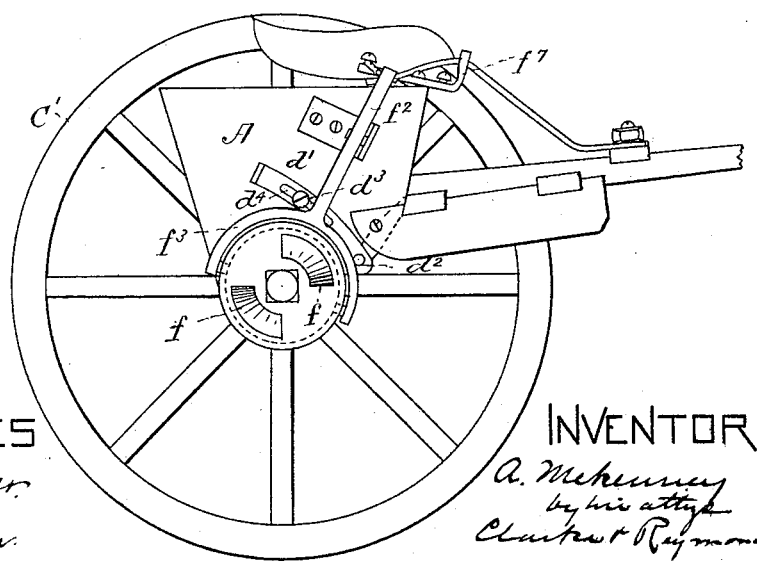

Figure 1 is a plan view of a distributer containing my invention. Fig. 2 is a view in elevation on the line $x\ x$ of Fig. 1. Fig. 3 is a central vertical section. Fig. 4 is an elevation of the back side of a wheel, and Figs. 5 and 6 are detail views hereinafter referred to.

The invention relates to the following-described features, whereby a very strong and serviceable construction is provided, and also one that distributes the fertilizing material continuously and uniformly.

Referring to the drawings, A represents the box or receptacle for holding the fertilizing material. Its sides $a\ a'$ slope toward each other, and a long narrow opening, $a^2$, is provided at the bottom. In this opening is arranged the feed-roll B, which comprises a shaft preferably of wood, and covered with teeth or projections $b$, arranged spirally thereon. These teeth preferably are made of iron, and are rounded upon their outer or working surface and ends, and have two arms, which are driven into the roll to hold them firmly in place. By arranging the teeth spirally upon the roll instead of in vertical lines a much more efficient and uniform feed is obtained, as each tooth is then a working one and does not act upon the line of any other one. This feeding-roll is attached to the box or receptacle by the boxes in the sides $a^3$, and the extensions $b'$ thereof furnish the axles for the wheels C C'. The opening $a^2$ is increased or decreased in size, as may be required, by means of the valve D, which extends across the box in front of the feed - roll and forms a lower portion thereof. This valve is hinged at $d$ to the front part of the box or receptacle, and is opened or closed and held in that position by means of the arms $d'$, (see Fig. 2,) which are pivoted at $d^2$ to each end of the valve, and are attached to the sides of the box or receptacle by means of a set-screw, $d^3$, which passes through a slot, $d^4$, therein.

Extending downwardly and toward the feed-roll from the lower edge of the valve are spring-arms $d^5$, which are attached to the outer surface of the valve, and project toward the feed-roll, and act in conjunction therewith, as hereinafter explained.

I have arranged within the receptacle to be operated by the roll an agitator, E, consisting of a plate either of metal or wood fastened at its upper edge, $e$, to the rear wall, $a'$, of the box or receptacle, and having its lower edge project into the lower portion of the box sufficiently to be struck or moved by the teeth as the feed-roll is revolved. There may be attached to this vibratory plate or agitator the arms $e'$, extending in a forward direction from the plate into the space within the box or receptacle, if desired.

It will be observed that by the rotation of the feed-roll the lower portion of the plate and its attachments, if any, are kept constantly reciprocating or in a tremor, which jars the material within the box and causes it to work down to the feed-roll, by which it is allowed to escape in uniform and continuous quantities.

It will also be observed that the opening in the front of the feed-roll is almost entirely closed by the spring-plate, but that if any material too hard to be readily pulverized by the roll should lodge in the opening the next tooth coming in contact therewith will force it down against the spring-arms and throw them back sufficiently to allow the escape of this obstacle to uniform feed from the box.

To cause the feed-roll to be revolved upon the forward movement of the distributer, and also to prevent the waste of the fertilizer upon the backward movement thereon, I have arranged a clutch mechanism connecting the shaft with the hubs of the wheel, which is adapted to be thrown into gear by the driver, and which acts upon the forward movement of the distributer, but which is automatically thrown out of gear upon the backward movement thereof, so that the motion of the roll upon the backward movement immediately stops. This construction of clutch comprises the movable members F, splined or otherwise secured to the shaft $b'$, so as to revolve therewith, and having on their front faces the projections or teeth $f$, which have square shoulders $f'$ at one end, and are gradually tapered to the face of the disk upon the upper surface. These teeth are adapted to engage with teeth $F'$, of similar construction, secured to the hub of the wheel, and the disks F are moved to engage their teeth with the teeth of the hub by means of the levers $f^2$, which have the yokes $f^3$, fitting recesses $f^4$ in the circumference of the disk, the arms $f^5 f^6$, and lever $f^7$, which is arranged in close proximity to the driver's seat, which preferably has an extending arm, whereby the driver can easily move it by his hand or knee.

It will be observed that by throwing in the clutches when the distributer is moving forward, the two shoulders of the teeth on the disks and hubs come in contact, and that thereby the shaft and feed-roll are caused to be revolved; but that upon a backward movement of the distributer the inclined surfaces of the teeth come together, and thereby cause the disks to be moved back upon the shaft, thereby disengaging the teeth.

The advantages of the various features of this construction are obvious.

The distributer may be used simply as a fertilizer-distributer, or in connection with other mechanism.

It will be observed that the mechanism herein described for connecting and disconnecting the wheels with the distributing-roll is very simple, easily applied, and used with very little power, and that a great saving is made in these respects compared with the ordinary clutch mechanism.

It will also be observed that the axle is a combination of the feed-roll; also, that the machine can be used for distributing manures or mixed fertilizers, or fine manures and commercial fertilizers, or any equivalent material without clogging.

Having thus fully described my invention, I claim and desire to secure by Letters Patent of the United States—

1. In a fertilizer-distributer, a box or receptacle, A, having opening $a^2$, and provided with a hinged valve, D, at its bottom on one side, said valve having attached thereto spring-arms $d^5$, in combination with feed-roll B, having teeth or projections $b$, the valve and spring-arms being made adjustable with relation to the feed-roll by means of slotted arms $d'$, secured to the sides of the box, substantially as described.

2. In a fertilizer-distributer, the combination, with box or receptacle A and feed-roll B, having teeth $b$, of agitator E, secured to the inner side of the box, said agitator comprising a downwardly-projecting plate for contacting with the teeth of the feed-roll and an upwardly and forwardly extending curved plate for agitating the material in the upper portion of the box, substantially as described.

3. In a fertilizer-distributer, the combination, with box or receptacle A, provided with an adjustable hinged valve, D, to which are attached spring-arms $d^5$, and agitator E, secured to the inner side of the box, of feed-roll B, having teeth $b$, said agitator comprising a downwardly-projecting plate for contacting with the teeth of the feed-roll and an upwardly and forwardly-extending curved plate for agitating the material in the upper portion of the box, substantially as described.

ALENDO MEKENNEY.

Witnesses:
CHARLES W. DRAKE,
EUGENE H. YORKE.